D. S. WAGENER.
Thrashing Machine.
No. 1,133.
Reissued Jan. 29, 1861.
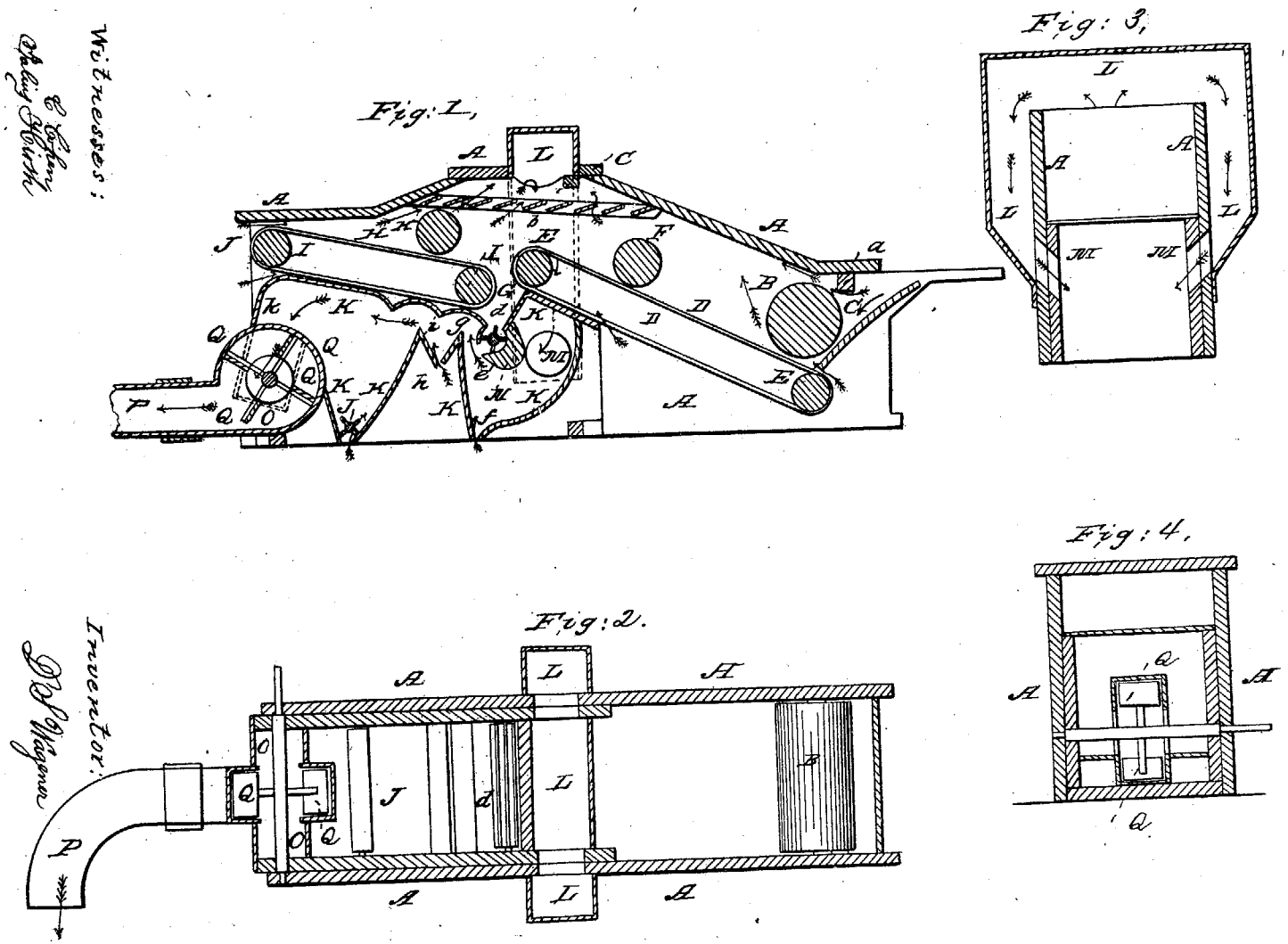
Witnesses:
C. Cofen
Philip Hirth
Inventor:
D. S. Wagener
N. PETERS, Photo-Lithographer, Washington, D. C.

UNITED STATES PATENT OFFICE.

DAVID S. WAGENER, OF PENN YAN, NEW YORK.

IMPROVEMENT IN THRASHING-MACHINES.

Specification forming part of Letters Patent No. 28,118, dated May 1, 1860; Reissue No. 1,133, dated January 29, 1861.

*To all whom it may concern:*

Be it known that I, DAVID S. WAGENER, of Penn Yan, in the county of Yates and State of New York, have invented certain new and useful Improvements in Thrashing-Machines; and I do hereby declare the following to be a full, clear, and exact description of the same, reference being had to the accompanying drawings, making a part of this specification, in which—

Figure 1 represents a longitudinal vertical section through the machine. Fig. 2 represents a horizontal section, and Figs. 3 and 4 represent vertical cross-sections, taken through the machine at different points.

Similar letters of reference, where they occur in the separate figures, denote like parts of the machine in all the drawings.

The object of my invention is to relieve the operators of thrashing-machines from working in and inhaling an atmosphere loaded with dust, and to prevent the scattering of the dust during the operation of thrashing; and my invention consists in so combining a fan with a grain thrashing and separating mechanism as that the fan shall, when rotated, draw into the machine a current of air at every open point in the case, and draw and concentrate said currents of air toward itself, and become the vehicle for taking up and carrying all the dust that is thrown off in the thrashing or separating process out of the machine to any proper depository.

To enable others skilled in the art to make and use my invention, I will proceed to describe the same with reference to the drawings.

A represents an outer case, in one end of which is located the thrashing-cylinder B. The grain to be thrashed is fed in at C, and is carried by the thrashing-cylinder (which runs in the direction of the arrow marked thereon) into the machine, and the grain and straw, though separated, are promiscuously thrown upon the carrying-belt D, which is moved by the drum or drums E E, over which it passes. Over the thrashing-cylinder, and a little in advance of it, is a guard-board, *a*, to prevent the straw, &c., from passing into the machine over the cylinder. The dust that is thrown off in advance of and at the thrashing-point is drawn into the machine by the action of the fan, and as represented by the red arrows, and is thus prevented from flying in the face of the attendant, who stands at the mouth of the machine. While the straw and grain are being carried up on the belt or apron D they are shaken or stirred up by the roller F, to allow the grains to detach themselves from the straw, and the dust that rises here is immediately caught up by the current or currents of air that are drawn in at all points and carried to the fan. When the straw and grain arrive at the upper end of the belt D, the grain, chaff, &c., will drop through the open space G, while the straw and some adhering grains will pass onto a second conveyer-belt, H, that moves around the drums I, and is carried out of the machine at J. A shake motion is given to the belt H by the revolving shake-roller K, to detach any grains that may cling to the straw. The dust that may arise on this second belt and at the exit J is caught up by the blast or current of air entering at J, and with that previously gathered up is passed through the slatted frame *b* into a chamber, *c*, above it, and this chamber communicates directly with the passages L, which extend over the top of and down the sides of the machine, and enter at M, and thence to the fan or fan-case. The grain that falls through the space G drops upon a feed-wheel, *d*, which is turned fast enough to feed the grain through, while the wheel or its wings close up the space in which it turns and prevents much of the blast from passing through at that point. As the grain, chaff, &c., drop from the directing-board N at *e*, the lighter stuff is taken up by the blast moving toward the fan-chamber, and the grain drops through the blast and may pass out at *f*. A current of air coming in at *f*, as shown by the arrow there, takes up whatever of dust or light impurities that it can carry or aid in carrying and conveys them on toward the fan. Some lighter grains may be taken up by the blast at *e* and carried beyond the point *g*; but as the blast expands beyond that point, and consequently becomes less powerful, these lighter grains will drop into and through the opening at *h*. The chaff and other light impurities pass over the point *i*, where the blast is considerably expanded—so much so as to give up the chaff, &c., which drops upon a wheel, *j*, that is turned fast enough to pass it through and out of the machine, and at the same time prevent much air from rushing in at that point. The dust which has been accumulated by the incoming currents is carried into the fan-case O by proper passages, and is from thence driven out through the trunk or trough P to any suitable depository outside of the building by the fan Q.

It should have been mentioned, in connection with the slatted frame *b*, that its object was to prevent straw, &c., from going into the dust-passages L, which passages lead to the fan, and to allow straws to get into the fan would impair its operations very much.

It will be perceived that so far as the thrashing and conveying apparatus is concerned it is like ordinary machines for that purpose. The separating apparatus is inclosed in a second or independent case, *k k k*, and may be separately built from the thrashing and straw-carrying devices, and connected with thrashing-machines already built, it being only necessary to connect the space G, through which the grain falls, with the separating mechanism, and to connect the dust-passages L with the exhaust or suction fan Q, and the entire separation will go on. The dust being taken up at all points is drawn to and then expelled by the fan, the heavy plump grains drop through the space *f*, the lighter grains drop through the space *h*, the chaff and other light stuff passes out at *j*, and thus the whole operation of thrashing, cleaning, and separating grain is carried on without the attendants being annoyed, if not injured, by inhaling the dust that is always thrown off from the grain, straw, &c., and the straw, too, is thus deprived of all the dust that ordinarily clings to it, leaving it in better condition for feeding it to cattle.

Having thus fully described the nature and object of my invention, what I claim therein as new, and desire to secure by Letters Patent, is—

In combination with a thrashing mechanism inclosed in an outer case, and an exhaust or suction fan inclosed in a fan-case, the communicating trunks or passages which connect them, for the purpose of causing all the incoming currents of air to become vehicles for carrying and concentrating the dust in the fan-case, from whence it is driven to any proper depository, substantially as described.

D. S. WAGENER.

Witnesses:
E. COHEN,
JULIUS HIRSH.